United States Patent
Panigrahi et al.

(10) Patent No.: US 6,752,223 B2
(45) Date of Patent: *Jun. 22, 2004

(54) ROLLER CONE BIT WITH IMPROVED SEAL GLAND DESIGN

(75) Inventors: Amiya K. Panigrahi, Dallas, TX (US); Mark P. Blackman, Lewisville, TX (US); Guy James Lefort, Grand Prairie, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 09/942,270

(22) Filed: Aug. 28, 2001

(65) Prior Publication Data

US 2002/0027326 A1 Mar. 7, 2002

Related U.S. Application Data

(62) Division of application No. 09/259,851, filed on Mar. 1, 1999, now Pat. No. 6,279,671.

(51) Int. Cl.[7] ............................................. E21B 10/22
(52) U.S. Cl. ..................... 175/57; 175/371; 277/587; 384/94
(58) Field of Search ......................... 175/57, 371, 372; 384/94; 277/587

(56) References Cited

U.S. PATENT DOCUMENTS

| | | | |
|---|---|---|---|
| 2,200,151 A | * 5/1940 | Burkhardt | 239/DIG. 4 |
| 2,401,379 A | * 4/1946 | Smith | 267/161 |
| 2,593,193 A | * 4/1952 | Rockwell | 277/453 |
| 3,765,495 A | * 10/1973 | Murdoch et al. | 175/228 |
| 4,073,548 A | * 2/1978 | Walters | 175/228 |
| 4,151,999 A | 5/1979 | Ringel et al. | 277/165 |
| 4,290,297 A | * 9/1981 | Anderson | 340/870.04 |
| 4,336,946 A | 6/1982 | Wheeler | 277/211 |
| 4,372,624 A | * 2/1983 | Neilson | 277/587 |
| 4,484,753 A | * 11/1984 | Kalsi | 277/336 |
| 4,554,985 A | 11/1985 | Backlund | 175/371 |
| 5,009,519 A | 4/1991 | Tatum | 384/94 |
| 5,129,471 A | * 7/1992 | Maurstad et al. | 175/228 |
| 5,524,718 A | * 6/1996 | Kirk et al. | 175/371 |
| 5,655,611 A | 8/1997 | Dolezal et al. | 175/371 |
| 6,279,671 B1 | * 8/2001 | Panigrahi et al. | 175/371 |

* cited by examiner

*Primary Examiner*—Hoang Dang
(74) *Attorney, Agent, or Firm*—Robert Groover (57) ABSTRACT

In the seal gland in a rotating cone drill bit, the O-ring is initially compressed between the journal and a central portion of the gland which has a cross-section parallel to the journal. These two concentric surfaces provide a minimum amount of contact pressure for a given amount of squeeze than other configurations. Chamfers connect the central portion to the sidewalls of the gland, so that after the seal has worn in use, it will ride up onto the chamfers, where additional squeeze to the seal. This allows the seal to operate in a standard regime during the first part of its lifetime and to automatically shift to a more compressed mode as the seal wears.

7 Claims, 12 Drawing Sheets

ROLLER CONE BIT WITH IMPROVED SEAL GLAND DESIGN

This is a divisional of application Ser. No. 09/259,851, filed Mar. 1, 1999 and now issued as U.S. Pat. No. 6,279,671.

BACKGROUND AND SUMMARY OF THE INVENTION

The present invention relates to the design of a seal gland, especially but not exclusively to the design of a gland for a rotary seal in a remote environment.

BACKGROUND: BEARING SEALS

In applications in which relative motion is necessary, one of several types of bearings are used, such as ball bearings, roller bearings, or more simply journal bearings. A seal, such as an elastomeric seal, is typically used between the bearings and the outside environment to keep lubricant around the bearings and to keep contamination out. In a rotary seal, where one surface rotates around another, some special considerations are important in the design of both the seal itself and the gland into which it is seated. For instance, the elastomeric seal should be under compressive (never tensile) stress, and while there should be enough pressure between the seal and the rotating surface to prevent leakage, the pressure should be minimized to reduce friction and wear. Additionally, there should be enough room in the gland to allow for expansion under changing conditions but not excessive room which could allow the seal to twist or buckle.

Additional information regarding seals can be found in PRACTICAL SEAL DESIGN, Leonard J. Martini (1984) and in SEALS AND SEALING HANDBOOK, Fourth Edition, M. Brown (1995), both of which are hereby incorporated by reference.

BACKGROUND: DRILL BITS

Figure 6:
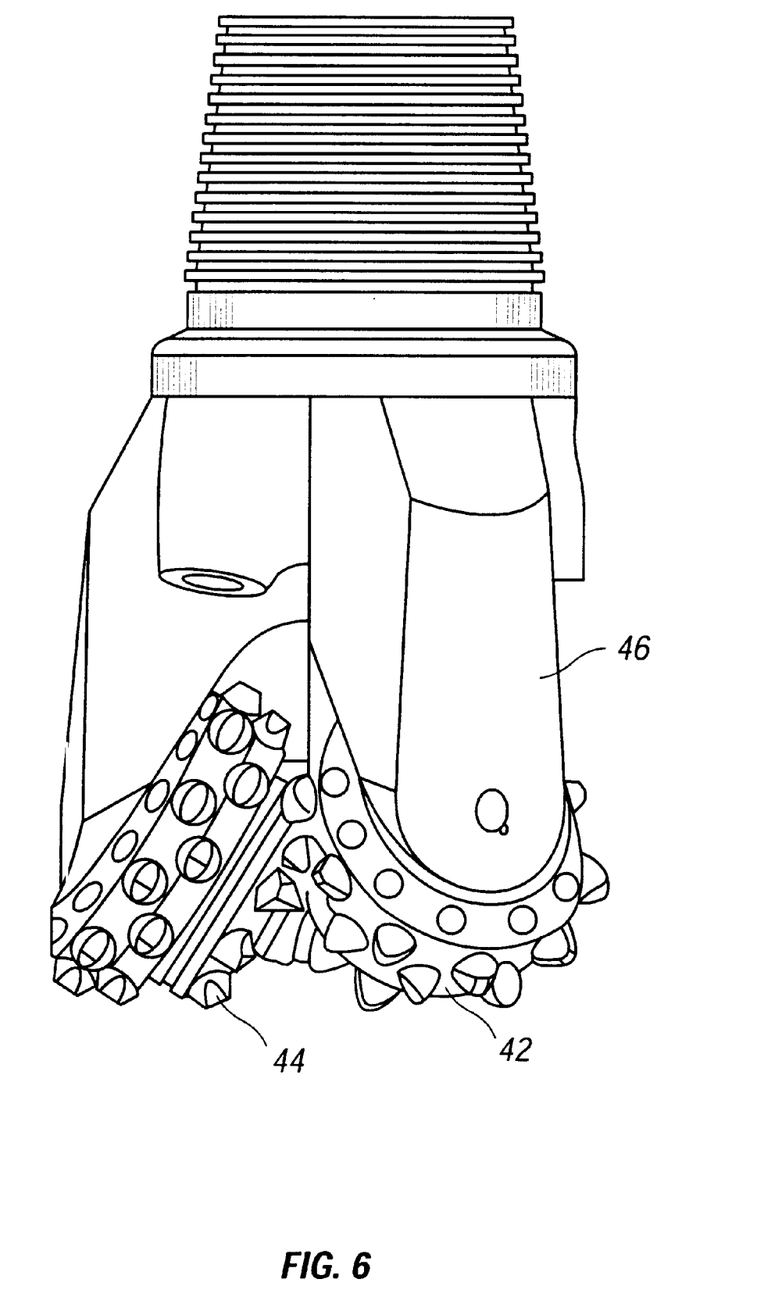
FIG. 6 shows a cone drill bit which can use the disclosed seal and gland.
Figure 7:
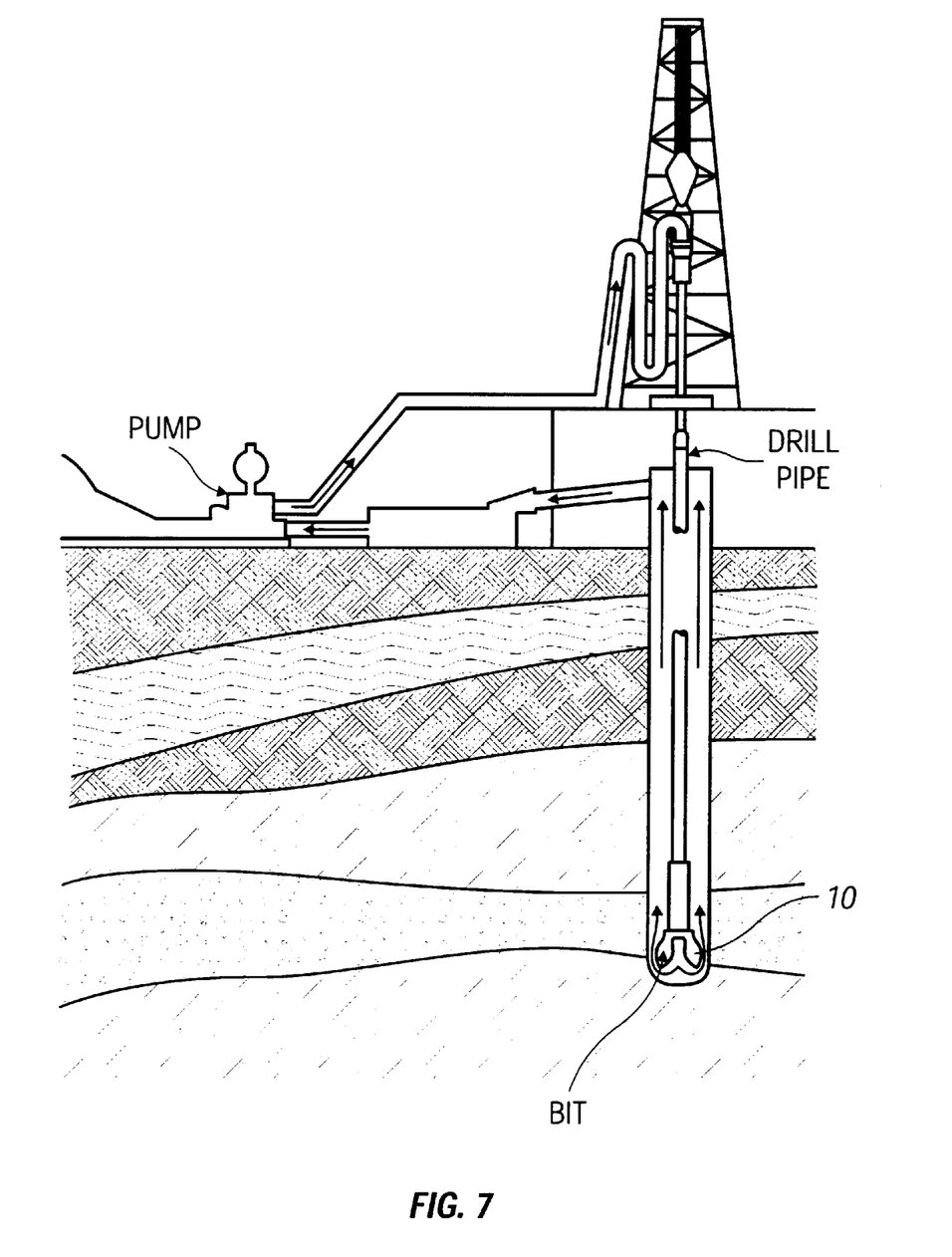
FIG. 7 shows a drill rig which can use the disclosed seal/gland combination.

One of the important types of rotary drill bits in the petroleum business is the roller cone bit, seen in FIG. 6. In such bits, a rotating cones 42 with teeth 44 on its outer surface is mounted on an arm 46 of the drill bit body. FIG. 7 shows a drill rig, including the drill bit and a drill string, which includes sections of pipe which transfer rotational force to the bit and which carry drilling fluid to the bottom of the hole, where it washes out debris. As the drill bit rotates, the applied weight-on-bit ("WOB") forces the downward pointing teeth of the rotating cones into the formation being drilled. Thus the points of the teeth apply a compressive stress which exceeds the yield stress of the formation, and this induces fracturing. The resulting fragments are flushed away from the cutting face by a high flow of drilling fluid, referred to as "mud".

Although improvements have been made in roller-cone-type bits over the years, improvements have continued to be needed in the seals which protect the bearings. The constraints on the seals used in these applications are different from those of other low-speed sealing applications in several respects. First, everything in a bit, which operates deep in the earth, must be extremely robust to withstand the pressure and eccentric motion to which the bits are subjected. Additionally, the seals are themselves exposed to abrasive materials from two sources: not only does the drilling fluid near the cutting face include a heavy load of abrasive material (which is moving very turbulently at very high velocities), but the bearings themselves, as they wear, will tend to produce metal particles, and these metal particles themselves may be abrasive to a soft seal. Thus, both sides of the seal should ideally be protected from these abrasive effects. Additionally, the bit is operating in a remote environment from which it may take hours to retrieve for replacement, so it is highly desirable to have the bit operate for as long as possible.

For sealing on a rock bit, an O-ring, or a derivative of O-ring, are typically used. One problem with this seal is that, as the bit is operated, the seal will inevitably wear, so that less compressive force is applied against the moving surface, running the risk that a leak will develop across the seal.

One previous gland design is seen in U.S. Pat. No. 4,372,624 to Neilson and is reproduced in FIG. 8. In this patent it is seen that an O-ring of circular cross-section is confined within a pair of symmetrical and complementary V-shaped surfaces having rounded vertices, one V-shaped surface being formed on a bearing journal within the body of a rock bit, the other V-shaped surface on the cutter cone mounted on the journal. This design allows the O-ring to move axially in response to differential pressure across the seal, with movement in either direction causing an increase in the squeeze on the seal. Reserve squeeze is provided if and only if needed.

Figure 9:
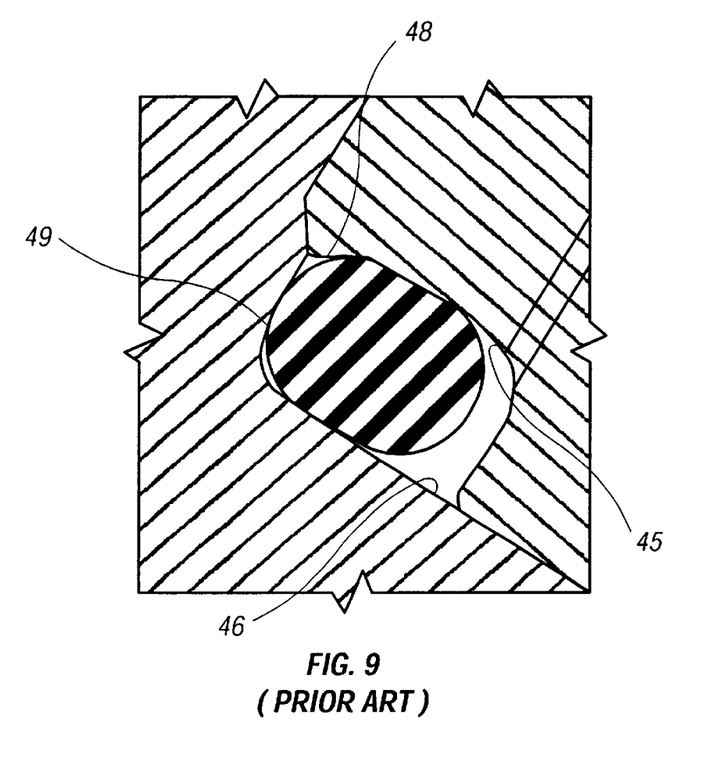
FIG. 9 is a prior art seal gland which biases the O-ring inwardly.

Another type of gland design is seen in U.S. Pat. No. 5,129,471 to Maurstad et al., and is reproduced in FIG. 9. In this gland, two walls are in the moving cone, while the other two are part of the stationary journal. The seal rides between surfaces 45 and 46 having flat cross-sections, with a shroud or protrusion 48 to bias the O-ring away from wall 49 and prevent wear.

IMPROVED SEAL GLAND DESIGN FOR LOW-SPEED ROTARY APPLICATION

Figure 8:
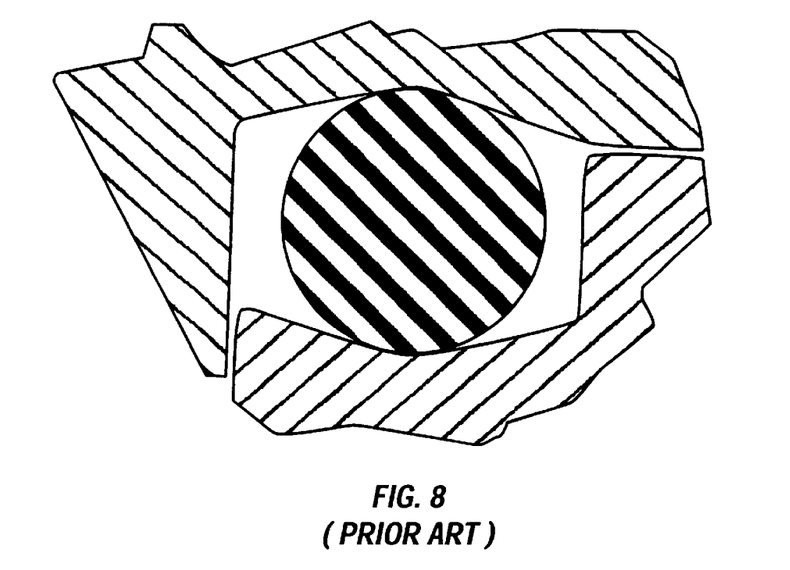
FIG. 8 is a prior art seal gland which offers increased squeeze if axial shifting occurs.

The present inventors have noted that for a given amount of squeeze on the seal, the contact pressure across the sealing surface is minimum when the seal is compressed between two surfaces whose cross-section is flat, as compared to a V-surface or any other surface with a radius. This means that while the gland of FIG. 8 provides advantages in the latter portions of the seal lifetime, it does not provide optimum sealing in the early part of the seal's use.

The present application discloses a seal gland whose shape provides two modes of operation: in the first part of its lifetime, the seal is seated on a base portion of the gland, which is concentric with the journal sealing surface, so that it functions analogously to a normal elastomeric seal, providing adequate compression as installed; but as the sealing element wears and contact pressure is lessened (resulting in more axial movements with either cone vibration or a small pressure differential), the axial movement of the seal causes it to be further compressed by a chamfer within the gland. Unlike the previous attempts to solve this problem, this solution seeks to optimize the function of the seal while minimizing the wear in both portions of its lifetime.

In some embodiments, the present application discloses a seal having a cross-section which is roughly circular, but with a recess in the side on which movement occurs, so that lubricant can be provided therein.

In some embodiments, this application further discloses preventive measures to protect the seal and lubricant from contamination. A groove trap can be placed circumferentially on the cone or arm journal bearing or on the seal boss surfaces. This trap collects and stores bearing wear materials that are generated during cone rotation, keeping them out of the sealing surfaces.

In some embodiments, this application further discloses a filter on both sides of the sealing surface to prevent both cutting and bearing materials from contaminating the seal surface. This filter takes the form of another ring of a softer elastomeric material, which will inherently wear slower than the seal itself.

The disclosed innovations, in various embodiments, provide one or more of at least the following advantages:
lifetime of the seal is improved; and
the correct amount of pressure is maintained on the seal during its lifetime.

BRIEF DESCRIPTION OF THE DRAWING

The disclosed inventions will be described with reference to the accompanying drawings, which show important sample embodiments of the invention and which are incorporated in the specification hereof by reference, wherein:

FIG. 4 shows a seal having two annular surfaces of contact at the moving surface and lubricant storage in between.

DETAILED DESCRIPTION OF THE PREFERRED EMBODIMENTS

The numerous innovative teachings of the present application will be described with particular reference to the presently preferred embodiment (by way of example, and not of limitation).

Truncated Cone-Shaped Gland

Figure 1:
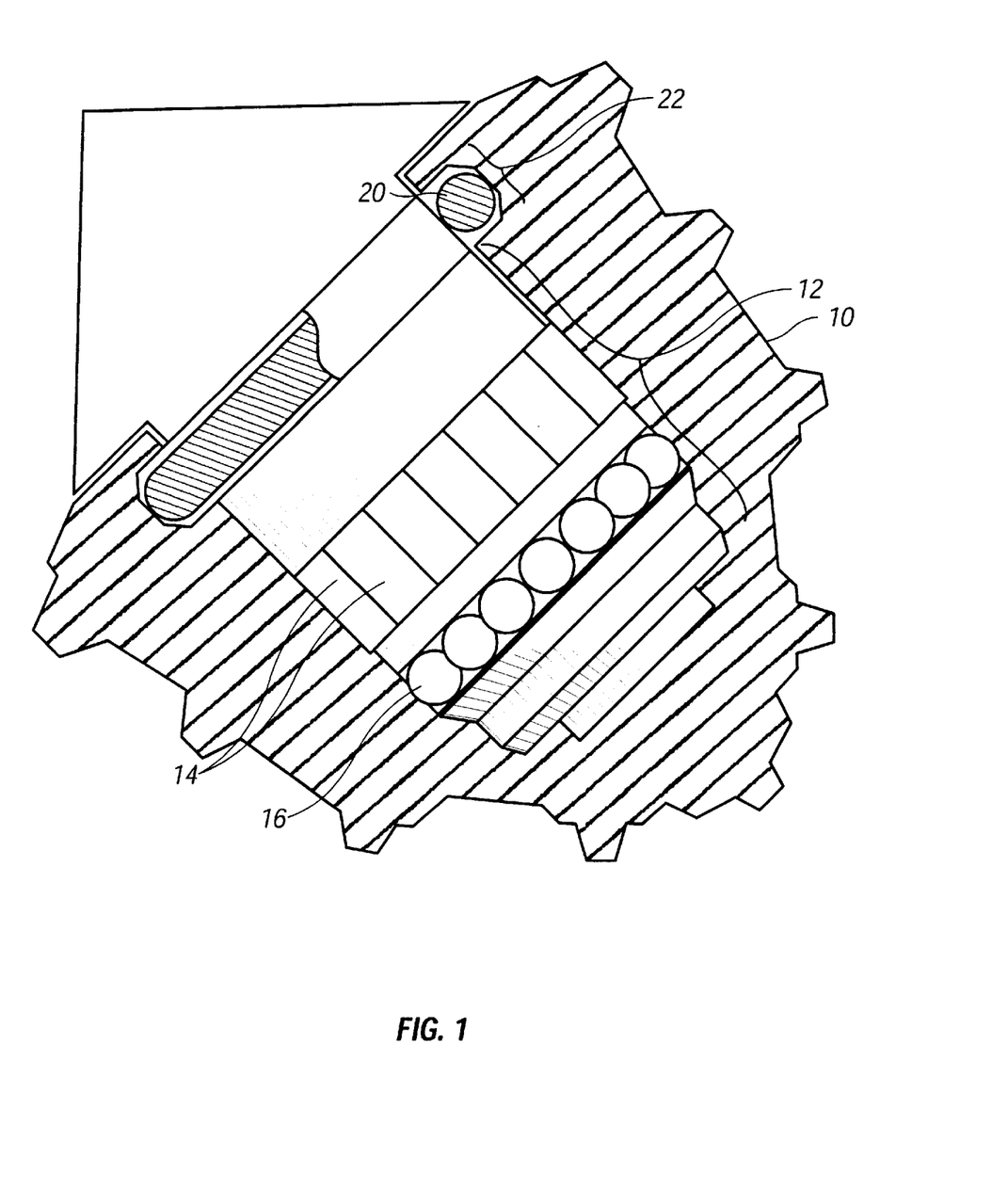
FIG. 1 shows sectional view of a cone drill bit, showing the disclosed seal and gland.

Seen in FIG. 1 is a sectional view of a portion of a roller cone bit. Seen in outline is the external surface of the roller cone 10, while the journal 12 with roller bearings 14 and ball bearings 16 are seen as they fit in the cone. The seal 20 and gland 22, which lie within the cone as it rotates around the journal, are seen in a cut-away which show their cross-section.

Figure 2:
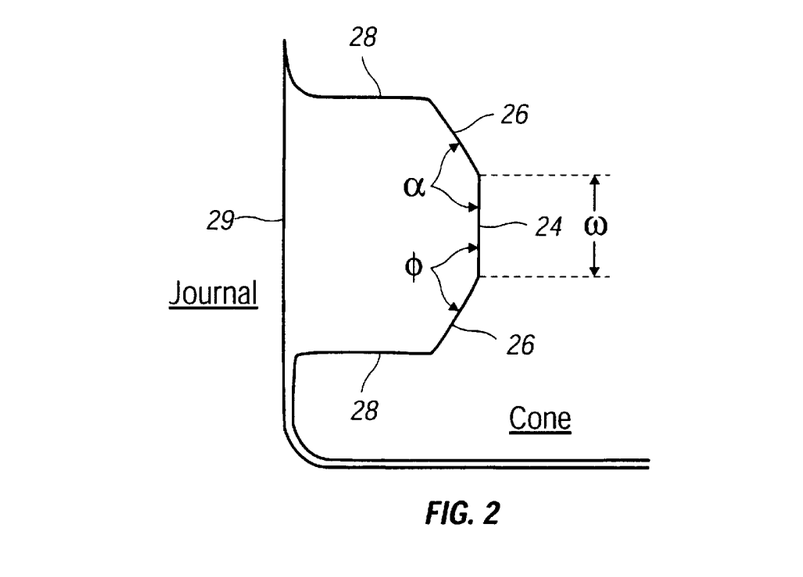
FIG. 2 shows a cross-sectional view of the sealing surfaces of one embodiment of this invention.

FIG. 2 shows a cross-sectional view of the sealing surfaces of one embodiment of this invention, with the journal on the left and the rotating cone on the right (the seal itself is not shown). In this embodiment, the seal gland is seen as a groove formed into the interior portion of the cone. The cross-section of the gland shows a central flat area 24 bounded on both sides by chamfers 26 which connect the flat area to the sidewalls 28. The journal forms a further wall 29 of the gland. It will be understood that the two surfaces in this drawing between which the seal is compressed (i.e. 24 and 29) are actually concentric cylindrical walls.

Figure 10:
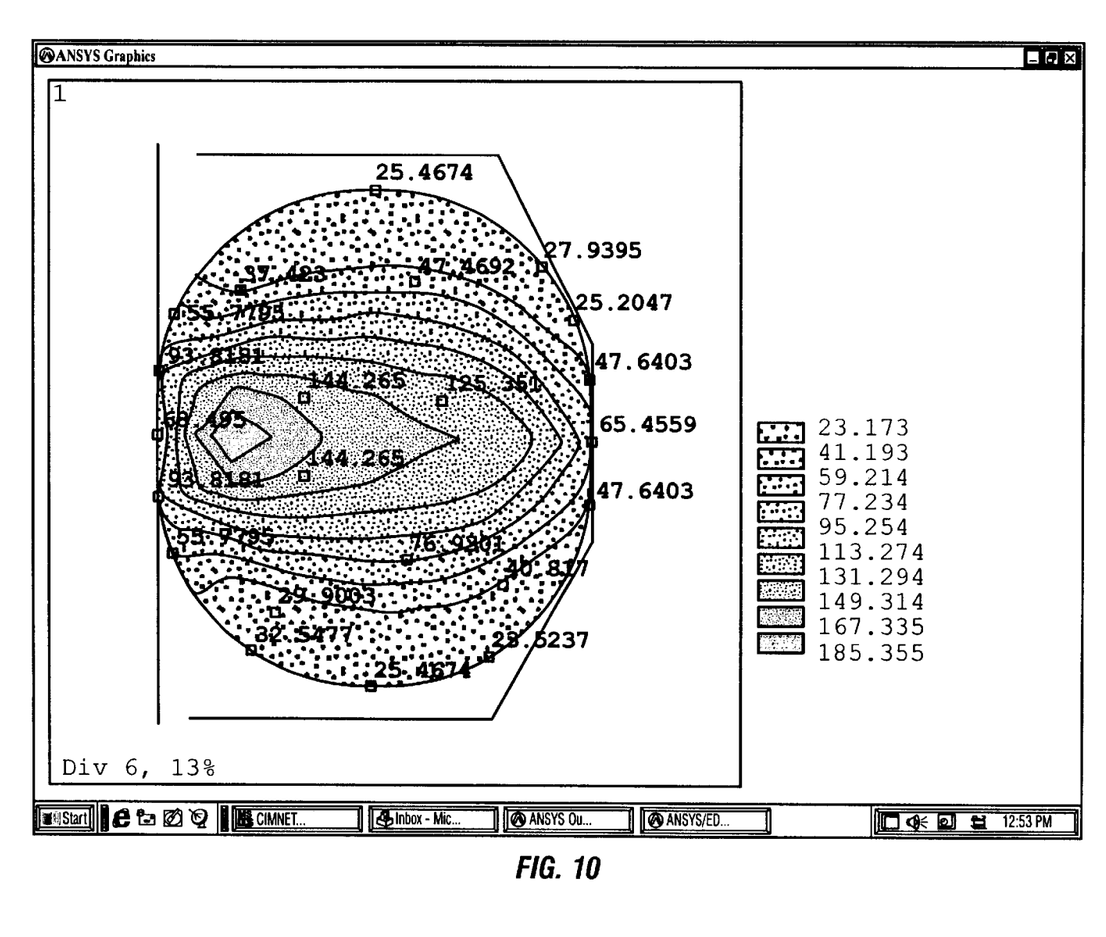
FIG. 10 is a finite element analysis output showing pressure distribution in the seal after installation.
Figure 11:
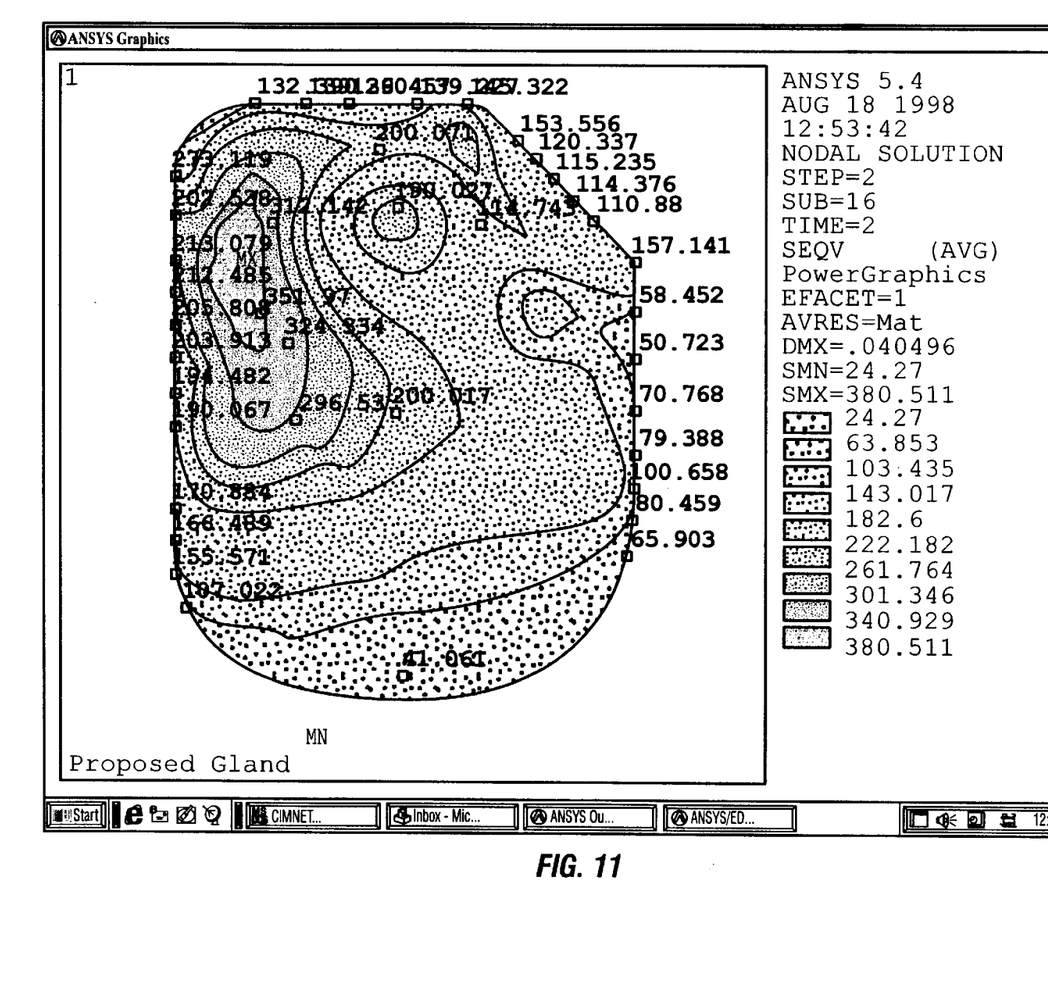
FIG. 11 is a finite element analysis output showing pressure distribution in the compressed seal once it has shifted onto the chamfer, causing increased contact.

Gland dimensions have been determined by finite element analysis (FEA), a computer-aided technique which helps predict the response of physical systems to external load. Using this technique, it has been determined that the angle of the chamfers to the flat area ($\alpha$ and $\emptyset$), in the presently preferred embodiment, are in the range of 110–150 degrees. The central section, in the presently preferred embodiment, has a width W, which is approximately 40–60% of the cross-sectional diameter of the seal. When the O-ring is seated in the gland, it will be under slight compressive forces which force the seal to seat in the deepest portion of the gland, i.e., against flat central portion 28. FIG. 10, shows an FEA of the seal after the cone is assembled on the journal. In the axial direction, there is a slight gap, so that the seal is not compressed in this direction. It is worth noting that although the cone is the moving part of the bit, the seal moves with the cone, so that the moving surface is between the seal and wall 29. After a significant portion of its lifetime has passed, the seal will show enough wear that the pressure holding it in place is lessened. Small pressure differentials between the bearing lubricant and the external environment will cause the seal to shift axially onto the chamfers. This causes additional squeeze to be applied to the seal, compensating for the wear. FIG. 11 is an FEA of the seal once it has shifted onto the chamfer.

Alternate Embodiment: Chamfer on One Side

In an alternate embodiment, the gland has a larger flat area, extending from the upstream side of a pressure differential to a chamfer on only ONE side of the flat area. This embodiment is not optimal for use in a drill bit, where small pressure differentials can happen in either direction, but for applications where the pressure differential is all in one direction, this is a viable alternative.

Alternate Embodiment: Chamfer on the Journal

In a less preferred embodiment, the chamfers are formed on the journal instead of, or in addition to, the rotating cone. This is less desirable, as movement onto the chamfers would then result in additional contact area at the dynamic surface, increasing the wear.

Alternate Embodiment: Differing Chamfer Angles

Although angles $\alpha$ and $\emptyset$ will generally be equal, this is not necessary for the practice of the invention. If it is known that greater pressure will be applied in one direction than in the other, the two angles can be scaled appropriately to provide different amounts of squeeze on the O-ring.

Alternate Embodiment: Biannular Seal

Figure 4:
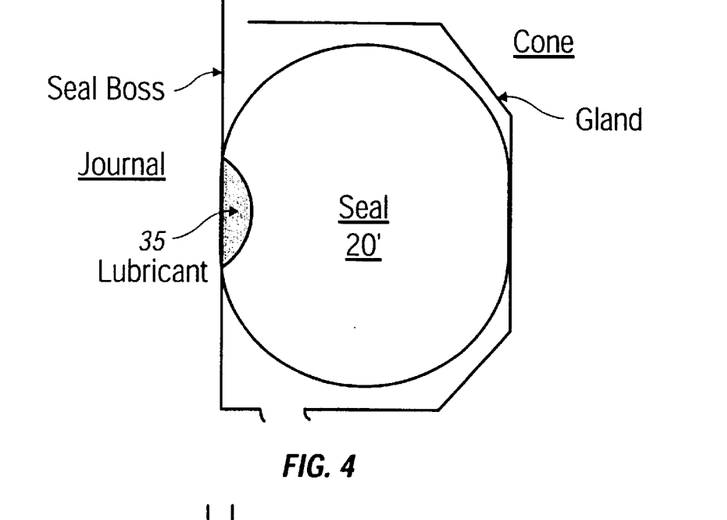

In an alternate embodiment, the cross-section of the elastomeric seal is seen in FIG. 4. In this embodiment, the portion of the seal 20' which contacts the journal has a concave shape so that the seal (in cross-section) touches the journal in only two spots which are axially separated. This is in contrast to the more common O-ring (or derivative)

shape, in which a segment of the seal's circumference is compressed against the journal. The two-point contact effectively acts as two separate seals, while the concave, inner portion of the seal provides storage for a lubricant 35. Both the two-point contact itself and the lubricant carried by the seal reduce the friction noted at this surface and improve the lifetime of the seal.

Alternate Embodiment: Groove Trap

Figure 3:
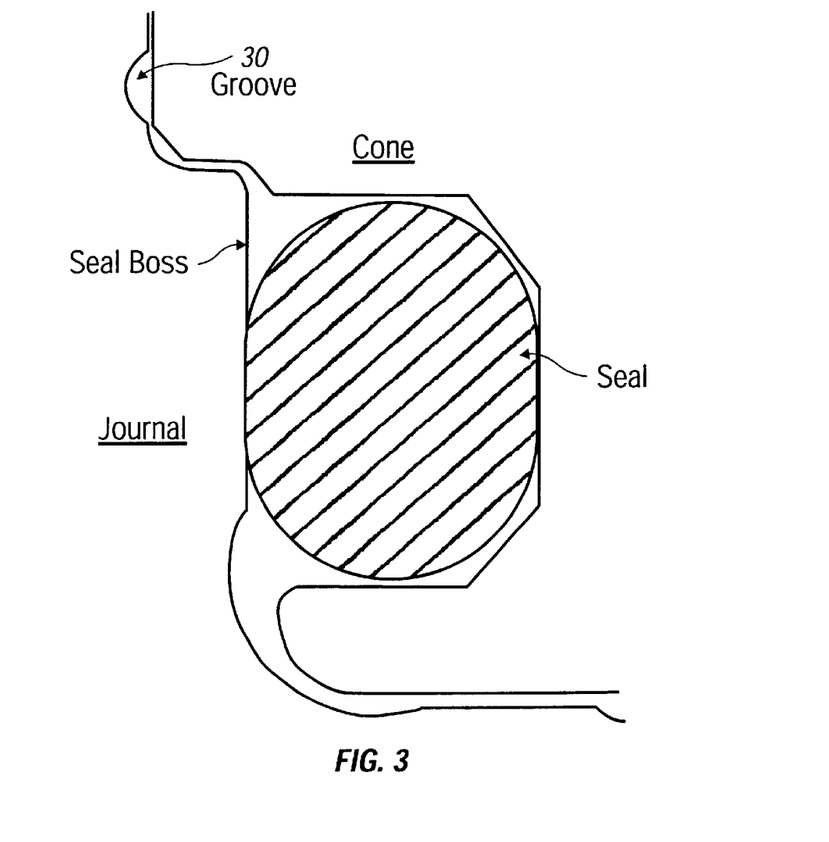
FIG. 3 shows an embodiment of the invention in which a groove is designed on the journal bearing surface.

In an alternate embodiment of the invention, a circumferential groove is provided in either the journal or the cone between the bearings and the seal. FIG. 3 shows such a groove 30 placed on the journal surface. This groove, which opens onto the space which separates the journal from the cone, provides a location where bearing material, borne by the lubricant, can settle out before reaching the seal, and can be designed in either the journal or the cone.

Alternate Embodiment: Filter Added

Figure 5:
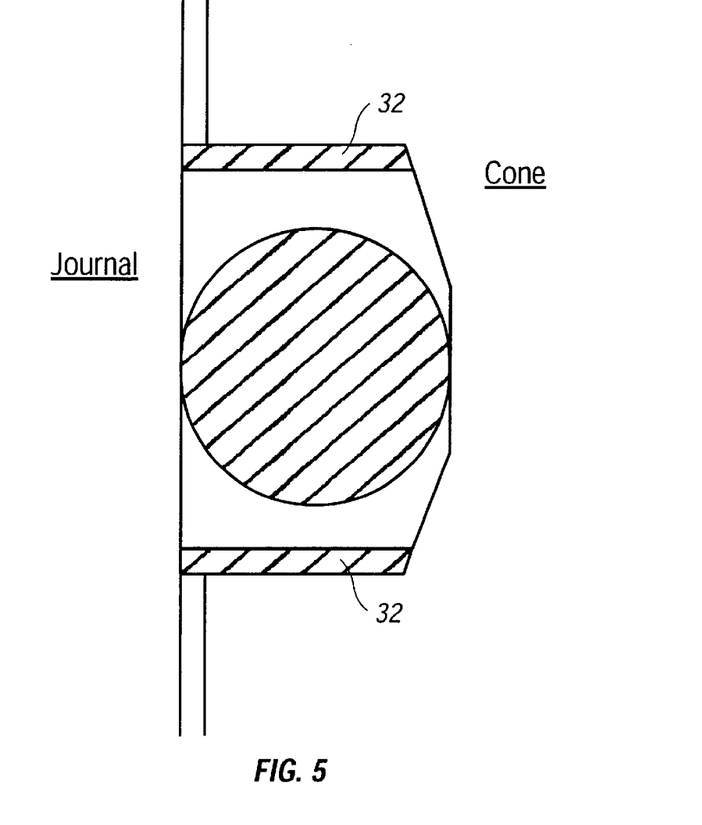
FIG. 5 shows placing filter materials on both sides of the seal.

In another aspect of the invention, "filters" can be placed along the sidewalls of the seal gland. These filters are rings formed of a softer elastomer than the seal itself, ensuring that they wear less than does the seal. The filters act to trap bearing wear material migrating from the bearings on one side, and to trap the highly abrasive drilling mud on the other side of the seal. An example of a seal gland having two filters 32 is shown in FIG. 5.

Alternate Embodiments: Other Filter Location/ Shapes

Seen in FIGS. 12–15 are FEA analyses of the seal using alternative embodiments for the shape and location of the filter. Note that in these embodiments, the gland shape is modified to accommodate a soft elastomeric sleeve/filter 34 on the wall of the gland opposite the journal, with the sleeve filling the gap between the journal and the cone where this gap is exposed to the drilling mud. When the seal is assembled, the O-ring 20 finds its stable seating position between the journal and the filter material.

Figure 12:
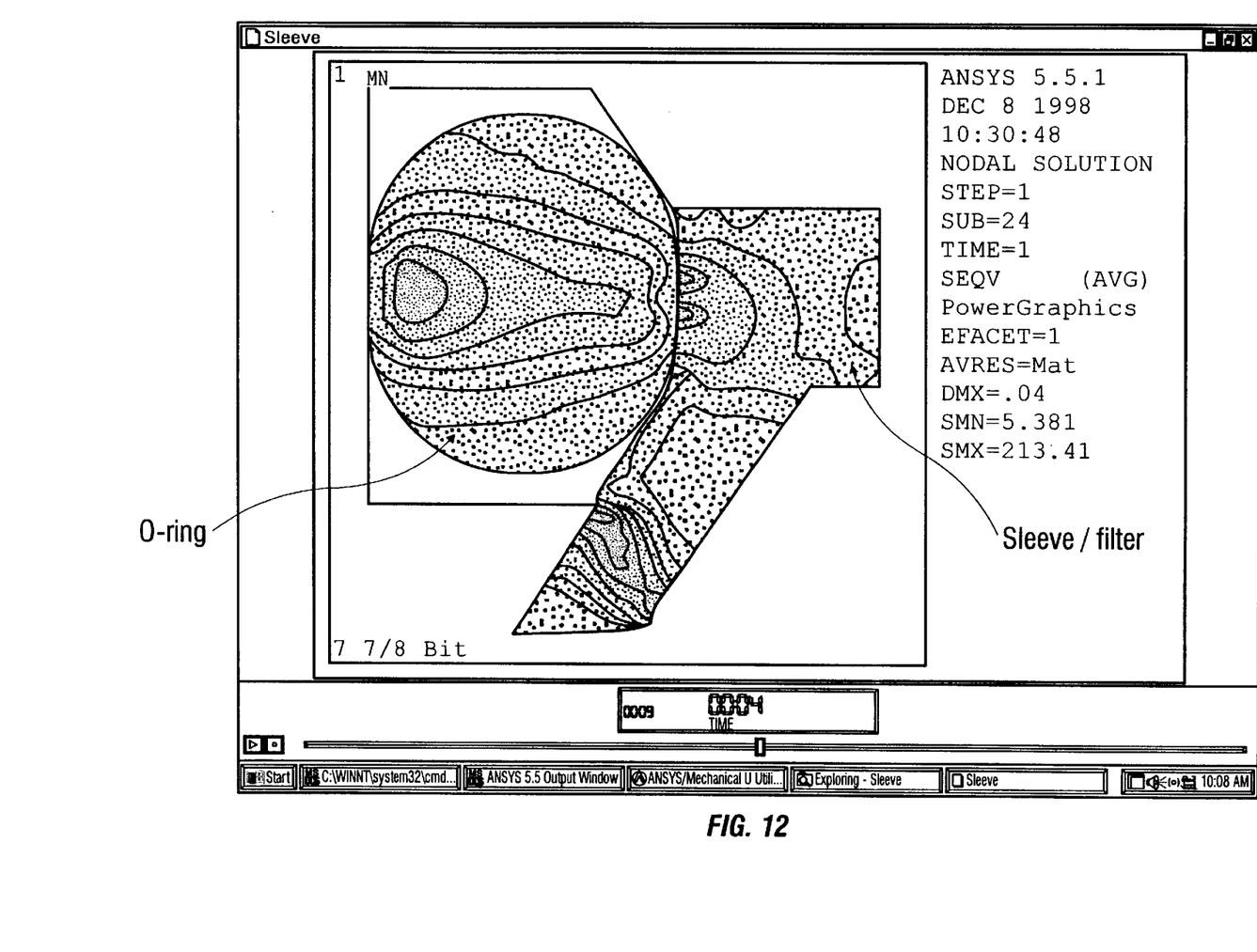
FIGS. 12–15 are finite element analyses of alternate embodiments of glands having a sleeve/filter on the side of the seal opposite the journal.
Figure 13:
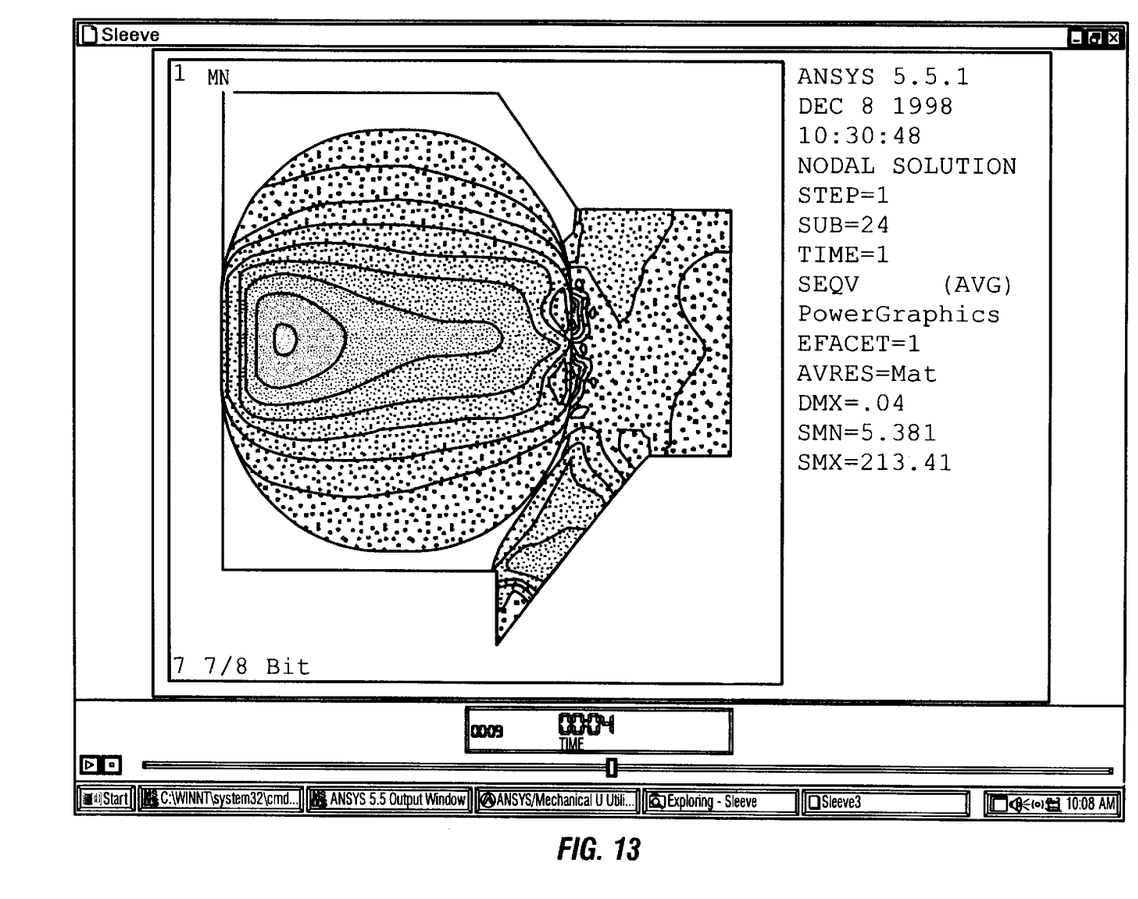
Figure 14:
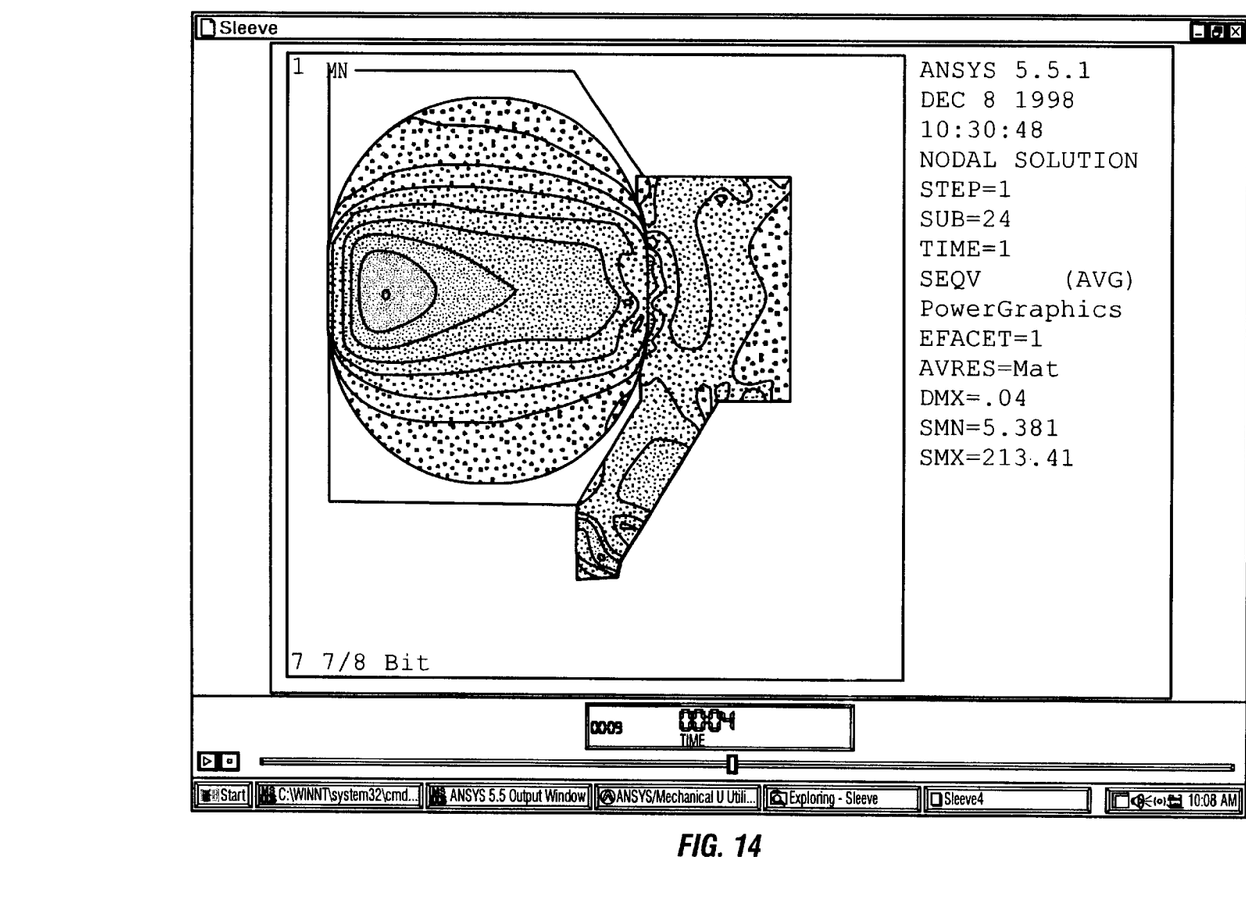
Figure 15:
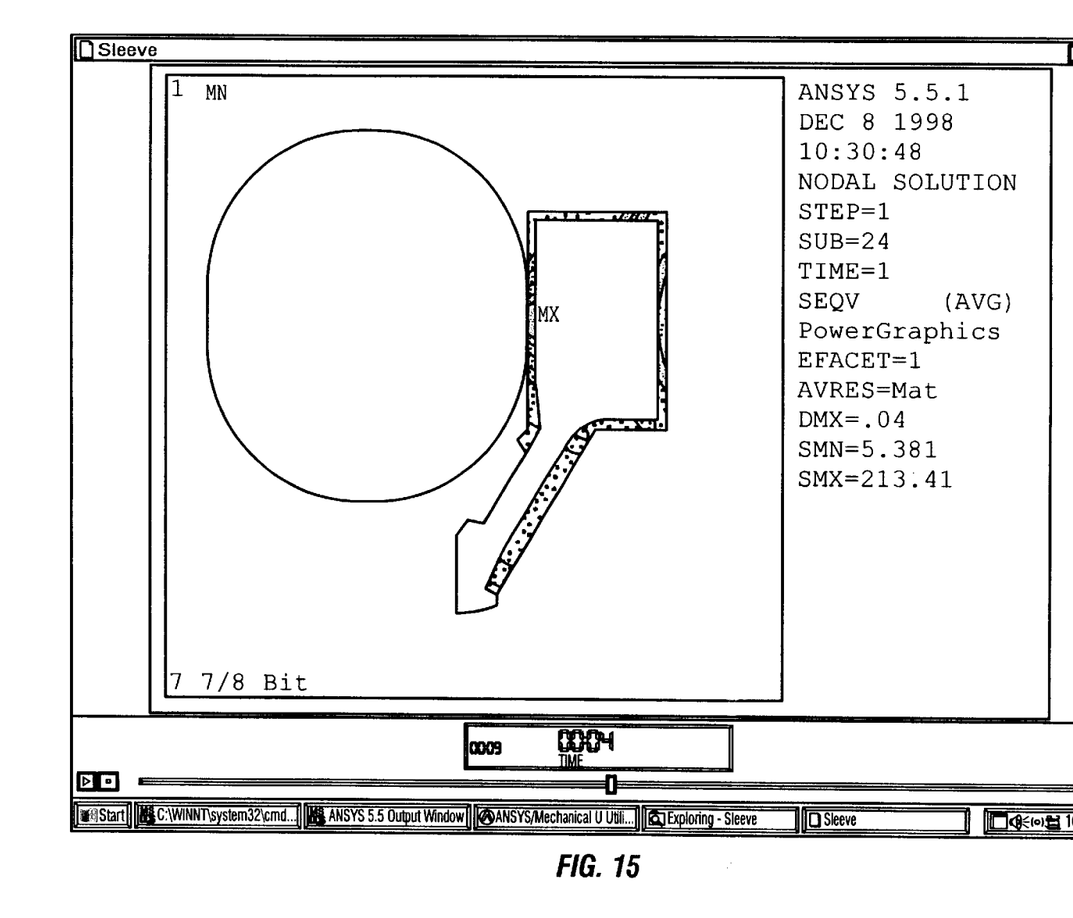

FIGS. 12, 13, and 14 each show a sleeve with slightly different geometries, while FIG. 15 shows an elastomeric sleeve with a metal/polymer material around it.

Alternate Embodiment: Backing Ring

In an alternate embodiment, a backing ring, formed of a stiffer material than the O-ring, can be added to provide lateral support.

Alternate Embodiment: Belleville Ring

In an alternate embodiment, a Belleville can be added to apply a lateral preload within the gland.

Alternate Embodiment: Other Types of Seals

In an alternate embodiment, the disclosed gland and seal can be used in other types of seal applications, such as a face seal.

Definitions

Following are short definitions of the usual meanings of some of the technical terms which are used in the present application. (However, those of ordinary skill will recognize whether the context requires a different meaning.) Additional definitions can be found in the standard technical dictionaries and journals.

Gland: a housing or cavity for accommodating compression packings or sealing rings.

Seal: a device for closing (sealing) a gap and/or making it fluid tight.

Roller cone bit: a drilling bit made of two, three, or four cones, or cutters, that are mounted on extremely rugged bearings. Also called rock bits.

Squeeze: deformation of a seal produced when assembled with an interference fit; note that excessive squeeze is to be avoided as this can overstress the material and produce premature ageing.

According to a disclosed class of innovative embodiments, there is provided: A sealing structure, comprising: an elastomeric sealing element positioned in a base position, between two concentric surfaces, to operate stably while providing sealing in said base position; and a mechanical structure, positioned to apply compression to said sealing element after said sealing element has worn enough to shift out of said base position under pressure.

According to another disclosed class of innovative embodiments, there is provided: A sealing structure, comprising: a groove having a cross-section which is substantially rectangular with at least one chamfered corner; an elastomeric seal which fits into said groove, providing a seal with a sealing surface which opposes said groove in such a manner that during a first substantial phase of its lifetime, said elastomeric seal is not substantially compressed by said chamfered corner, but during a subsequent substantial phase of its lifetime, said elastomeric seal is compressed by said chamfered corner; whereby the longevity of said seal is improved.

According to another disclosed class of innovative embodiments, there is provided: A rotary seal for use under a known maximum working pressure differential, comprising: a gland in a first element of a rotary joint; a sealing surface in a second element of said rotary joint, said sealing surface being smooth and positioned in proximity to said gland; and a compressible sealing element interposed between said gland and said sealing surface; wherein said gland includes not only sidewalls, but also a basic seating position between said sidewalls, and a chamfer between said basic seating position and a first one of said sidewalls; and wherein said sealing element, said gland and said sealing surface have relative dimensions such that for a first substantial portion of the operating lifetime of said sealing element, said sealing element is compressed, between said basic seating position and said sealing surface, sufficiently to withstand said expected pressure differential, and after the dimensions of said sealing element are changed by wear, said sealing element can automatically be shifted by said expected pressure differential onto said chamfer within said gland, to provide increased compression of said sealing element against said sealing surface.

According to another disclosed class of innovative embodiments, there is provided: A rotary seal, comprising: a sealing surface in a first element of a rotary joint; a gland in a second element of said rotary joint, said gland having a first surface which is concentric with said sealing surface, sidewalls which are axially separated from said first surface, and a chamfer which connects said first surface to one of said sidewalls; a compressible sealing element interposed between said gland and said sealing surface.

According to another disclosed class of innovative embodiments, there is provided: A rotary cone bit, comprising: a cutting element rotatably mounted on an arm of said rotary cone bit; a groove in said cutting element, having a cross-section which is substantially rectangular with at least one chamfered corner; an elastomeric seal which fits into said groove, providing a seal with a sealing surface which opposes said groove in such a manner that during a first substantial phase of its lifetime, said elastomeric seal is not substantially compressed by said chamfered corner, but during a subsequent substantial phase of its lifetime, said elastomeric seal is compressed by said chamfered corner.

According to another disclosed class of innovative embodiments, there is provided: A drill rig, comprising: a drill string on which is mounted a rotary cone bit, said rotary cone bit containing a groove having a cross-section which is substantially rectangular with at least one chamfered corner; an elastomeric seal which fits into said groove, providing a seal with a sealing surface which opposes said groove in such a manner that during a first substantial phase of its lifetime, said elastomeric seal is not substantially compressed by said chamfered corner, but during a subsequent substantial phase of its lifetime, said elastomeric seal is compressed by said chamfered corner.

According to another disclosed class of innovative embodiments, there is provided: A method for operating a seal, comprising the steps of: (a.) during a first part of the lifetime of a compressible sealing element, compressing said sealing element between two concentric surfaces; (b.) thereafter, providing additional compression from a mechanical element which compensates for wear on said compressible sealing element.

According to another disclosed class of innovative embodiments, there is provided: A method of protecting a bearing, comprising the steps of: (a.) installing a sealing element between two cylindrical surfaces with initial elastic loading sufficient to provide a seal between said bearing and an external environment; (b.) providing a further surface onto which said sealing element can move only after wear degrades said sealing element, said further surface providing elastic loading sufficient to maintain said initial elastic loading.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC section 112 unless the exact words "means for" are followed by a participle.

What is claimed is:

1. A method for operating a seal, comprising the steps of:
   (a.) during a first part of the lifetime of a compressible sealing element, compressing said sealing element between two concentric surfaces, wherein the width of one of said two concentric surfaces is 40–60% of the cross-sectional diameter of the sealing element;
   (b.) thereafter, providing additional compression from a mechanical element which compensates for wear on said compressible sealing element.

2. A rotary cone bit, comprising:
   a cutting element rotatably mounted on an arm of said rotary cone bit;
   a groove in said cutting element, having a cross-section which is substantially rectangular with at least one chamfered corner;
   an elastomeric seal which fits into said groove, providing a seal with a sealing surface which opposes said groove in such a manner that during a first substantial phase of its lifetime, said elastomeric seal is not substantially compressed by said chamfered corner, but during a subsequent substantial phase of its lifetime, said elastomeric seal is compressed by said chamfered corner;
   wherein said elastomeric seal is separated from a sidewall of said groove by a ring of a material which is softer than the material of said compressible sealing element.

3. A rotary cone bit, comprising:
   a cutting element rotatably mounted on an arm of said rotary cone bit;
   a groove in said cutting element, having a cross-section which is substantially rectangular with at least one chamfered corner;
   an elastomeric seal which fits into said groove, providing a seal with a sealing surface which opposes said groove in such a manner that during a first substantially phase of its lifetime said elastomeric seal is not substantially compressed by said chamfered corner, but during a subsequent substantial phase of its lifetime said elastomeric seal is compressed by said chamfered corner;
   wherein said elastomeric seal contacts said sealing surface at two locations which are axially separated from each other.

4. A rotary cone bit, comprising:
   a cutting element rotatably mounted on an arm of said rotary cone bit;
   a groove in said cutting element, having a cross-section which is substantially rectangular with at least one chamfered corner;
   an elastomeric seal which fits into said groove, providing a seal with a sealing surface which opposes said groove in such a manner that during a first substantial phase of its lifetime, said elastomeric seal is not substantially compressed by said chamfered corner, but during a subsequent substantial phase of its lifetime, said elastomeric seal is compressed by said chamfered corner.

5. A method of protecting a bearing, comprising the steps of:
   (a.) installing a sealing element between two cylindrical surfaces with initial elastic loading sufficient to provide a seal between said bearing and an external environment;
   (b.) providing a further surface onto which said sealing element can move only after wear degrades said sealing element, said further surface providing elastic loading sufficient to maintain said initial elastic loading.

6. The method of claim 5, wherein the width of said cylindrical surface is 40–60% of the cross-sectional diameter of said compressible sealing element.

7. The method of claim 5, wherein said bearing is part of a roller cone bit.

* * * * *